United States Patent [19]

Kanda

[11] Patent Number: 4,856,764
[45] Date of Patent: * Aug. 15, 1989

[54] FLUID-FILLED RESILIENT BUSHING HAVING DAMPING MEANS WITHIN FLUID CHAMBERS

[75] Inventor: Ryouji Kanda, Inuyama, Japan

[73] Assignee: Tokai Rubber Industries, Ltd., Aichi, Japan

[*] Notice: The portion of the term of this patent subsequent to Jun. 7, 2005 has been disclaimed.

[21] Appl. No.: 172,582

[22] Filed: Mar. 24, 1988

Related U.S. Application Data

[63] Continuation-in-part of Ser. No. 866,017, Jun. 24, 1987, Pat. No. 4,749,173.

[30] Foreign Application Priority Data

Jun. 30, 1986 [JP] Japan .................. 61-100615

[51] Int. Cl.⁴ ............... F16M 9/04; F16M 5/00
[52] U.S. Cl. ................ 267/140.1; 267/140.5; 267/141.2; 248/562
[58] Field of Search .......... 267/140.1, 140.2, 140.5, 267/141, 141.2, 35, 259, 219; 180/300, 312, 902; 248/562, 636

[56] References Cited

U.S. PATENT DOCUMENTS

| | | |
|---|---|---|
| 3,642,268 | 2/1972 | Hipsher . |
| 3,698,703 | 10/1972 | Hipsher . |
| 4,630,806 | 12/1986 | Dan et al. .................. 267/140.1 |
| 4,690,389 | 9/1987 | West ....................... 248/562 X |
| 4,700,934 | 10/1987 | Andra et al. ............... 248/562 X |
| 4,702,346 | 10/1987 | Uno et al. ................. 267/140.1 X |
| 4,749,173 | 6/1988 | Kanda ...................... 267/140.1 |

FOREIGN PATENT DOCUMENTS

| | | | |
|---|---|---|---|
| 3239963 | 5/1984 | Fed. Rep. of Germany . | |
| 2495718 | 6/1982 | France . | |
| 2582067 | 11/1986 | France . | |
| 0034541 | 2/1985 | Japan .................. | 267/140.1 |
| 0010138 | 1/1986 | Japan .................. | 267/140.1 |
| 2055172 | 2/1981 | United Kingdom . | |

*Primary Examiner*—Andres Kashnikow
*Assistant Examiner*—Richard Potosnak
*Attorney, Agent, or Firm*—Oliff & Berridge

[57] ABSTRACT

A fluid-filled resilient bushing including a resilient member interposed between inner and outer sleeves, and an elastically yieldable partition member. The resilient member and the partition member cooperate with the outer sleeve to define a pressure-receiving chamber and an equilibrium chamber, which are disposed opposite to each other in a first direction in which the bushing receives a vibrational load. The chambers communicate with each other through an orifice. The bushing includes a damping device which has a first portion disposed within the pressure-receiving chamber, so as to extend from a bottom of the chamber. The first portion has a radial end face whose periphery is spaced apart from the periphery of the pressure-receiving chamber, such that an annular spacing is formed between the peripheries of the first portion and the chamber. A second portion of the damping device projects from the first portion in a direction perpendicular to the first direction, such that an annular gap is formed between the periphery of the second portion and the periphery of the pressure-receiving chamber. This annular gap is dimensioned smaller than the annular spacing, and is effective for isolating high-frequency vibrations.

17 Claims, 3 Drawing Sheets

FLUID-FILLED RESILIENT BUSHING HAVING DAMPING MEANS WITHIN FLUID CHAMBERS

This application is a continuation-in-part application of U.S. Ser. No. 066,017 filed June 24, 1987 now U.S. Pat. No. 4,749,173 issued June 7, 1988.

BACKGROUND OF THE INVENTION

1. Field of the Invention

The present invention relates in general to a fluid-filled resilient or elastic bushing structure, and more particularly to such a bushing structure which is capable of exhibiting excellent spring characteristics for both low-frequency vibrations and high-frequency vibrations that are applied thereto in a diametrical direction of the structure.

2. Discussion of the Prior Art

There is known a resilient bushing for elastically connecting two members in a vibration system (through which vibrations are transmitted), for damping and/or isolating vibrations applied to the bushing in a given diametric direction of the bushing. The bushing has an inner sleeve in which a mounting rod or bolt is inserted, an outer sleeve on which a cylindrical mounting member is fitted, and a resilient member interposed between the inner and outer sleeves. For example, such a resilient bushing is used as a suspension bushing in a suspension system of an automotive vehicle, or an engine mount for mounting a power unit on the body of an F-F vehicle (front-engine, front drive vehicle).

Usually, the resilient bushing of the type indicated above is required to exhibit high vibration isolating characteristic for high-frequency vibrations having a small amplitude, and high vibration damping characteristic for low-frequency vibrations having a large amplitude. The traditional resilient bushing relies solely on the elastic nature (elastic deformation) of a resilient or elastic member, to provide both the vibration isolating capability and the vibration damping capability. Therefore, the bushing is difficult to satisfy these two different requirements. In particular, the traditional resilient bushing is not satisfactory in its capability of damping the low-frequency vibrations of large amplitudes.

In the light of the above inconvenience, a fluid-filled resilient bushing has been proposed in recent years. An example of such a fluid-filled bushing is disclosed in U.S. Pat. Nos. 3,642,268 and 3,698,703. This fluid-filled bushing has a pair of fluid chambers formed in a resilient member such that the fluid chambers are located opposite to each other in a diametric direction of the bushing in which vibrations are applied. These fluid chambers are filled with a suitable incompressible fluid, and communicate with each other through an orifice, so that the fluid may flow through the orifice, between the two chambers, upon application of low-frequency vibrations of a large amplitude in the diametric direction of the bushing.

In the fluid-filled bushing indicated above, the input low-frequency vibrations can be effectively damped due to inertia and resonance of the fluid mass in the orifice. The frequency range of the vibrations to be damped can be selected by suitably dimensioning the orifice.

If the orifice of this type of fluid-filled resilient bushing is dimensioned (in terms of its length and cross sectional area or diameter) so as to provide excellent damping capability for vibrations in a low frequency range, then the vibration isolating capability of the bushing is accordingly reduced for the high-frequency vibrations. The conventional bushings having a pair of diametrically opposite fluid chambers can not effectively isolate vibrations having a frequency higher than the resonance point of the fluid mass in the orifice, since the fluid mass in each fluid chamber becomes too rigid and the dynamic spring constant of the bushing becomes too high when such high-frequency vibrations applied to the bushing. Thus, there has been a need to develop a fluid-filled resilient bushing which is satisfactory in the overall vibration damping and isolating capability.

The present inventor has proposed in Japanese patent application No. 59-267768, filed Dec. 19, 1984, a fluid-filled resilient bushing of a type which has a pressure-receiving chamber adapted to receive axial vibrations to be damped, and an equilibrium chamber partially defined by an elastically yieldable thin-walled partition member. The pressure-receiving chamber and the equilibrium chamber communicate with each other through an orifice, and elastic deformation of the partition member permits a change in the volume of the equilibrium chamber. In this arrangement, the volume of the pressure-receiving chamber can be changed with flows of the fluid between the two chambers through the orifice, accompanied by elastic deformation of the partition member of the equilibrium chamber. This type of fluid-filled bushing provides excellent damping characteristics based on the flow resistance of the orifice and the inertia of the fluid masses, for low-frequency vibrations having a large amplitude. However, like the bushing disclosed in the United States Patents identified above, the bushing having such pressure-receiving and equilibrium chambers fails to provide satisfactory overall damping and isolating capability for both low-frequency and high-frequency vibrations of different amplitudes.

Another type of fluid-filled bushing has been proposed, as disclosed in U.S. Pat. Nos. 4,159,091 and 4,422,779. This bushing employs a pressure-absorber mechanism incorporating a movable plate which is disposed between two fluid chambers, so as to partially define these chambers. The movable plate is adapted to be moved by changing pressures in the two chambers, thereby contributing to lowering the dynamic spring constant of the bushing, for effectively isolating high-frequency vibrations of a small amplitude. However, the bushing using such a pressure-absorber mechanism tends to be extremely complicated in construction and accordingly less economical to manufacture, and requires a relatively large space for the pressure-absorber mechanism, causing the bushing structure to be bulky.

SUMMARY OF THE INVENTION

It is therefore an object of the present invention to provide an improved fluid-filled resilient bushing which is capable of exhibiting not only excellent damping characteristic for low-frequency vibrations of large amplitudes, but also excellent isolating characteristic for high-frequency vibrations of small amplitudes.

The above object may be achieved according to the present invention, which provides a fluid-filled resilient bushing, comprising: (a) an inner sleeve; (b) an outer sleeve disposed in radially outwardly spaced-apart relation with the inner sleeve; (c) a generally annular resilient member interposed between the inner and outer sleeves so as to connect the inner and outer sleeves, and having a pocket and an axial void which are located opposite to each other in a diametric direction of the inner sleeve parallel to a first direction in which the bushing is adapted to receive a vibrational load, the void being formed over an entire axial length of the bushing, the outer sleeve and the resilient member cooperating to define a fluid-tight pressure-receiving chamber such that the pocket is fluid-tightly closed by the outer sleeve, the pressure-receiving chamber being filled with an incompressible fluid; (d) an elastically yieldable thin-walled partition member disposed in the axial void, so as to form at least one recess, the outer sleeve and the partition member cooperating with each other to define at least one equilibrium chamber such that the at least one recess is fluid-tightly closed by the outer sleeve, the at least one equilibrium chamber being filled with the incompressible fluid; (e) means for defining at least one orifice which communicates with the pressure-receiving chamber and the at least one equilibrium chamber, and which permits the incompressible fluid to flow between the pressure-receiving chamber and the at least one equilibrium chamber; and (f) damping means which is disposed within the pressure-receiving chamber and which extends from a bottom of the pocket, substantially in the above-indicated first direction, the damping means including a first portion extending from the bottom of the pocket and a second portion provided on the first portion, the first portion having a radial end face spaced apart from the outer sleeve by a predetermined radial distance in the first direction, the radial end face having a peripheral edge which is spaced apart from a periphery of the pressure-receiving chamber in a second direction perpendicular to the first direction, the peripheral edge of the radial end face and the periphery of the pressure-receiving chamber cooperating to define therebetween an annular spacing in a plane which is parallel to the second direction and an axial direction of the bushing, the second portion of the damping means projecting from the first portion substantially in the second direction, such that the second portion cooperates with the periphery of the pressure-receiving chamber, to define in the above-indicated plane an annular gap which is smaller than the annular spacing.

In the fluid-filled resilient bushing of the present invention constructed as described above, input vibrations having comparatively low frequencies and comparatively large amplitudes may be effectively damped or attenuated, due to inertia and resonance of the fluid in the orifice when the fluid is forced to flow through the orifice between the pressure-receiving chamber and the at least one equilibrium chamber, upon application of the vibrations to the bushing in the direction in which the pressure-receiving chamber and the axial void are disposed in diametrically opposed relation with each other. Namely, the orifice permitting a restricted flow of the fluid therethrough is so dimensioned as to attain excellent damping of low-frequency vibrations of large amplitudes.

Since the orifice is dimensioned as described above, the orifice does not permit sufficient flows of the fluid therethrough when the bushing receives high-frequency vibrations having a small amplitude. Namely, the bushing cannot rely upon the fluid flows through the orifice, to provide a sufficiently low dynamic spring constant for isolating such high-frequency vibrations. However, the instant bushing is capable of isolating the high-frequency vibrations, due to inertia and resonance of the fluid masses which flow through the annular gap formed between the periphery of the pressure-receiving chamber, and the second portion of the damping means which projects from the first portion within the pressure-receiving chamber. More particularly, the high-frequency vibrations applied to the bushing in the diametric direction will cause the fluid to flow through the annular gap in the radial direction of the bushing, between the radially inner and outer sections of the pressure-receiving chamber which are substantially separated by the second portion of the damping means. In other words, the first and second portions of the damping means is dimensioned and positioned relative to the periphery of the pressure-receiving chamber, so as to isolate vibrations which have higher frequencies and smaller amplitudes than those of the vibrations that can be damped by the restricted flows of the fluid through the orifice.

Thus, low-frequency vibrations of large amplitudes can be damped due to the inertia and resonance of the fluid mass which is forced to flow through the orifice, as in the conventional fluid-filled bushing, while high-frequency vibrations of small amplitudes can be effectively isolated or blocked by the inertia and resonance of the fluid mass which is forced to flow through the annular gap formed between the second portion of the damping means and the periphery of the pressure-receiving chamber. Hence, the present fluid-filled resilient bushing exhibits better vibration isolating characteristic over the conventional bushing, and therefore provides improved overall damping and isolating capability for the vibrations applied in the diametric direction in which the pressure-receiving chamber (or pocket) and the at least one equilibrium chamber (or at least one recess) are arranged in mutually opposed relation.

As indicated above, the present bushing is given the above-mentioned excellent characteristic for high-frequency vibrations, by simply providing the damping means, having the first and second portions, within the pressure-receiving chamber. This arrangement is significantly simpler in construction and more economical to manufacture, than the conventional bushing equipped with a pressure-absorber mechanism incorporating a movable plate.

Since the present bushing has the axial void located diametrically opposite to the pressure-receiving chamber and extending over an entire axial length of the resilient member, the dynamic spring constant of the bushing can be held low sufficient to contribute to isolating high-frequency small-amplitude vibrations, as contracted with the conventional bushing having a pair of diametrically opposite fluid chambers, wherein the fluid mass in each fluid chamber becomes too rigid on both sides of the inner sleeve when such high-frequency vibrations are applied to the bushing and consequently the bushing exhibits a considerably high dynamic spring constant for the high-frequency vibrations.

Furthermore, the first portion of the damping means within the pressure-receiving chamber is adapted to be abuttable at its radial end face upon the inner surface of the outer sleeve, in the event that the inner sleeve and the outer sleeve are excessively displaced relative to each other in the diametric direction in which the pressure-receiving chamber and the axial void (or at least one equilibrium chamber) are disposed. Accordingly, the first portion of the damping means serves for protecting the annular resilient member between the inner and outer sleeves, from excessive elastic deformation upon excessive relative displacement between the two sleeves. Stated differently, the first portion prevents an excessive amount of relative displacement between the two members (mounting rod and cylindrical member) which are connected to the inner and outer sleeves of the bushing.

According to one feature of the present invention, the resilient member includes a support portion which is situated at the bottom of the pocket and fixed to the inner sleeve, and the first portion of the damping means is supported by the support portion of the resilient member.

According to another feature of the invention, the bushing further comprises a support member which is supported by the inner sleeve, and the first portion of the damping means is supported by the support member at the bottom of the pocket of the resilient member. In one form of this feature, the support member includes a stopper portion disposed in the axial void.

In accordance with a further feature of the invention, the second portion of the damping means comprises a restrictor secured to the radial end face of the first portion. The restrictor includes a peripheral portion projecting from the peripheral edge of the radial end face in the second direction. In one form of this feature of the invention, the restrictor member has a pair of axial projections which project from the peripheral edge of the radial end face of the first portion of the damping means, and a pair of circumferential projections which project from the peripheral edge of the radial end face of the first portion in a substantially circumferential direction of the generally annular resilient member, and the pair of circumferential projections are spaced from an inner circumferential surface of the outer sleeve by a predetermined distance in the second direction.

In another form of the above feature of the invention, the restrictor member includes a radial inner metallic portion secured to the radial end face of the first portion, and a radially outer elastic portion secured to the radially inner metallic portion.

In a further form of the same feature of the invention, the restrictor member has a generally arcuate cross sectional shape in a plane perpendicular to an axis of the bushing.

In still another form of the same feature of the invention, the restrictor member is secured to the radial end face of the first portion by threaded fastening means.

In a still further form of the same feature of the invention, a dimension of the peripheral portion of the restrictor member as measured in the first direction, and an area of the annular gap as measured in the plane, are determined so that high-frequency vibrations are isolated in the pressure-receiving chamber.

According to still another feature of the invention, the elastically yieldable partition member includes a pair of partition walls defining a pair of recesses which cooperate with the outer sleeve to define a pair of equilibrium chambers.

According to a still further feature of the invention, the means for defining an orifice comprises an intermediate sleeve disposed between the outer sleeve and the resilient member and having a plurality of apertures each of which is aligned with a corresponding one of openings of the pocket and the at least one recess of the resilient member, nd the intermediate sleeve has at least one circumferential groove formed in an outer circumferential surface thereof. In this case, the orifice is formed such that the at least one circumferential groove is closed by the outer sleeve and is open at opposite ends thereof in both the pressure-receiving chamber and a corresponding one of the at least one equilibrium chamber.

According to another feature of the invention, the pocket is formed in an axially middle portion of the generally annular resilient member.

According to a further feature of the invention, the inner and outer sleeves are disposed eccentrically with each other in the first direction, so that the inner and outer sleeves are brought into concentric relation with each other when the bushing is mounted in place.

In accordance with a still further feature of the invention, the second portion of the damping means is formed integral with the first portion.

According to another feature of the invention, the first portion of the damping means is abuttable at the radial end face thereof upon the outer sleeve, in the event that the inner sleeve and the outer sleeve are excessively displaced relative to each other in the diametric direction in which the pressure-receiving chamber and the axial void are located.

The partition member may preferably be formed integral with the resilient member.

BRIEF DESCRIPTION OF THE DRAWINGS

The above and optional objects, features and advantages of the present invention will become more apparent by reading the following detailed description of a preferred embodiment of the invention, when considered in conjunction with the accompanying drawings, in which.

DETAILED DESCRIPTION OF THE PREFERRED EMBODIMENT

To clarify the concept of the present invention, the cylindrical engine mount for an F—F (front-engine front-drive) vehicle, constructed according to one embodiment of the invention, will be described in detail, by reference to the accompanying drawings. The engine mount is used for mounting a power unit on the body of the F—F vehicle.

Figure 1:
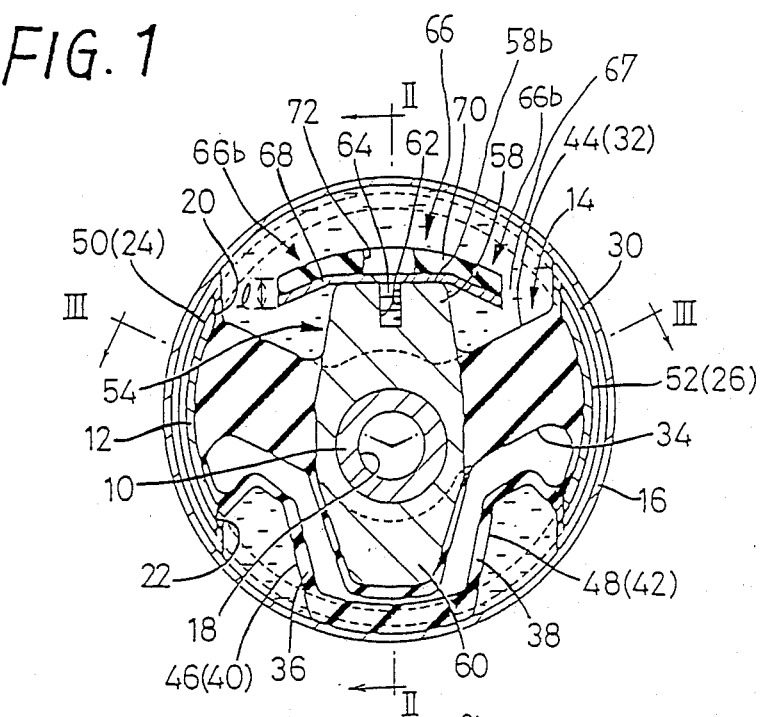
FIG. 1 is an elevational view in axial cross section of one embodiment of a fluid-filled resilient bushing of the invention in the form of an engine mount for an automotive vehicle of a front-engine, front-drive type.
Figure 3:
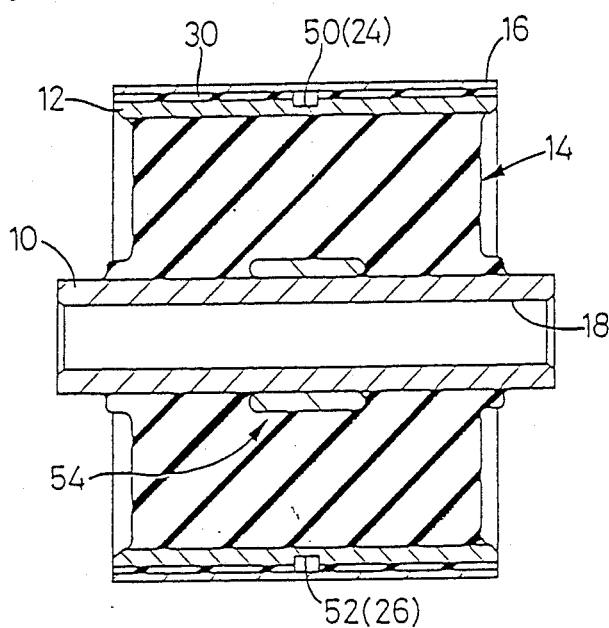

Referring first to FIGS. 1 and 3, reference numerals 10 and 12 designate an inner sleeve and an intermediate or third sleeve, respectively, both of which are made of metallic materials. The inner sleeve and the third sleeve are disposed eccentrically with each other in a diametric direction of the bushing. A resilient member in the form of a generally annular rubber block 14 is interposed between the inner and third sleeves 10, 12 so as to elastically connect these sleeves. An outer sleeve 16 made of a metallic material is fitted on the outer surface of the third sleeve 12. The present engine mount is installed between the power unit and the body of the vehicle, such that a cylindrical fitting secured to one of the two members of the vehicle is fitted on the outer surface of the outer sleeve 16, while a mounting rod secured to the other of the two members is inserted through a bore 18 of the inner sleeve 10. The inner and outer sleeves 10, 16 (the inner and third sleeves 10, 12) are brought into concentric relation with each other when the resilient bushing is installed in place while receiving the weight of the power unit. The rubber block 14 is integrally secured to the outer surface of the inner sleeve 10 and the inner surface of the third sleeve 12 by means of vulcanization.

Figure 4:
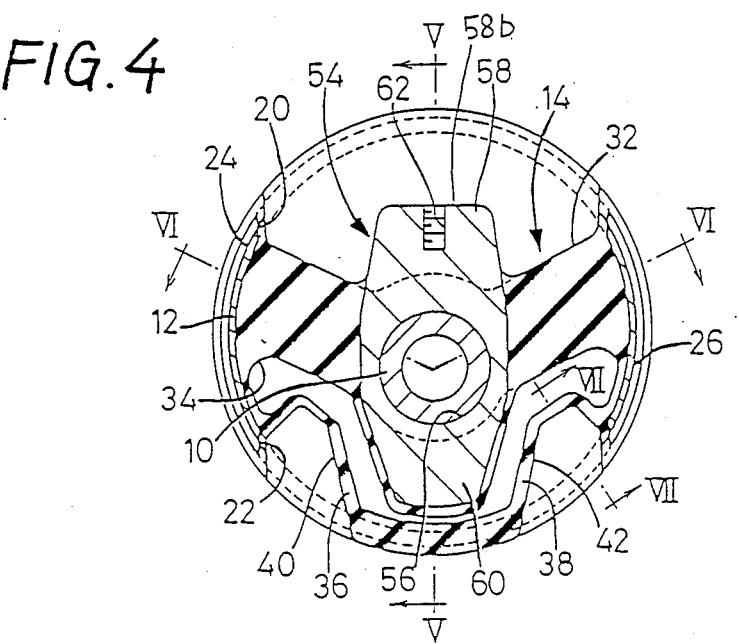
FIG. 4 is a cross sectional view corresponding to that of FIG. 1, showing an assembly of the bushing including a rubber block secured to metallic members by vulcanization, before attachment of an outer sleeve to the inner assembly.
Figure 6:
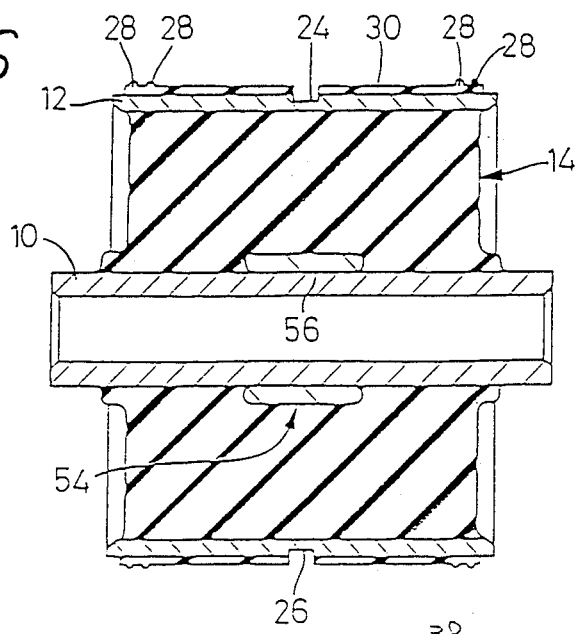
Figure 7:
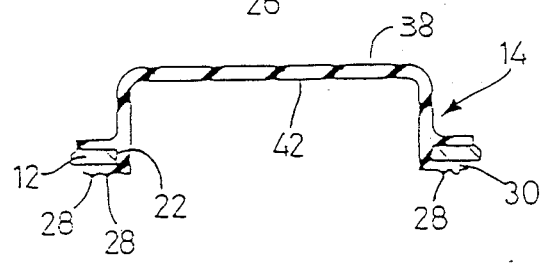

The third sleeve 12 secured to the outer circumferential surface of the rubber block 14 has a pair of apertures 20, 22. As shown in FIGS. 4 and 6, these apertures 20, 22 are disposed opposite to each other in a diametric direction of the bushing in which the bushing receives a vibrational load. This direction is hereinafter referred to as "vibration-input direction". In diametrically opposite portions of the outer circumferential surface of the third sleeve 12, there are formed a pair of circumferential grooves 24, 26 for connecting the apertures 20, 22. Further, a sealing rubber layer 30 is secured by vulcanization to the entire outer surface of the third sleeve 12, except its areas in which the circumferential grooves 24, 26 are open. The sealing rubber layer 30 is formed as an integral part of the rubber block 14 and has a pair of sealing lips 28 at each of the opposite axial ends of the bushing.

Reference is now made to FIGS. 4–7. In an axially middle portion of the rubber block 14, there is formed a pocket 32 which is aligned with the aperture 20 in the third sleeve 12. The rubber block 14 further has a void 34 aligned with the other aperture 22, such that the void 34 extends over an entire axial length of the rubber block 14. There is disposed in the void 34 an elastically yieldable thin-walled partition member in the form of a pair of partition walls 36, 38. The partition walls 36, 38 are adapted to form a pair of recesses 40, 42, respectively, which are spaced apart from each other by a certain distance in the circumferential direction of the rubber block 14. Each of the recesses 40, 42 is aligned with the corresponding portions of the aperture 22 and communicates with the pocket 32 through corresponding one of the circumferential grooves 24, 26. The partition walls 36, 38 are materially connected to the rubber block 14, at a circumferential position of the bushing between the openings of the two recesses 40, 42, as most clearly indicated in FIG. 4.

Figure 2:
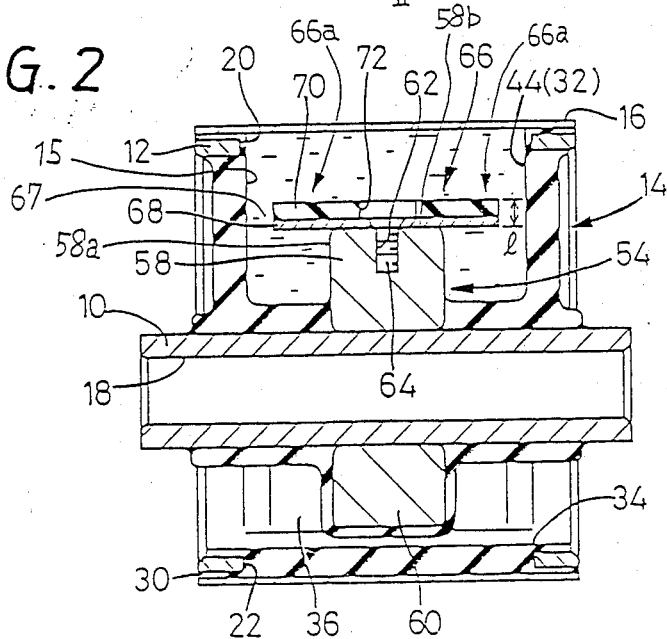
FIG. 2 and FIG. 3 are elevational views in transverse cross section of the resilient bushing, taken along lines II—II and III—III of FIG. 1, respectively.

In the present resilient bushing, the outer sleeve 16 is fitted on the third sleeve 12 which is secured to the outer circumferential surface of the rubber block 14, as illustrated in FIGS. 1 through 3, such that the pocket 32 and the recesses 40, 42, as well as the apertures 20, 22, are fluid-tightly closed by the outer sleeve 16. Thus, the outer sleeve 16 and the rubber block 14 cooperate to define a pressure-receiving chamber 44 which corresponds to the pocket 32, and a pair of equilibrium chambers 46, 48 which correspond to the recesses 40, 42. The circumferential grooves 24, 26 are also fluid-tightly closed by the outer sleeve 16, whereby a pair of orifices 50, 52 are formed. These orifices permit restricted fluid flows between the pressure-receiving chamber 44 and each of the equilibrium chambers 46, 48. In the present embodiment, an operation to fit the outer sleeve 16 onto the third sleeve 12 is carried out within a mass of a suitable incompressible fluid such as water, alkylene glycols, polyalkylene glycols, silicone oil, low molecular weight polymers, or a mixture thereof. In this fitting process, the pressure-receiving chamber 44 and each of the equilibrium chambers 46, 48 are filled with the incompressible fluid.

In assembling the instant bushing, the outer sleeve 16 fitting on the rubber block 14 is subjected to a suitable drawing operation to compress the third sleeve 12 in the radially inward direction. The drawing operation may be achieved, for example, by using eight dies disposed around the outer sleeve 16. The thus obtained bushing is further subjected to a suitable drawing operation.

The length and cross sectional area of the orifices 50, 52 are determined so that vibrations of a desired relatively low frequency range can be effectively damped due to inertia and resonance of the fluid masses in the orifices 50, 52 when the fluid is forced to flow through these orifices between the pressure-receiving chamber 44 and the equilibrium chambers 46, 48.

Figure 5:
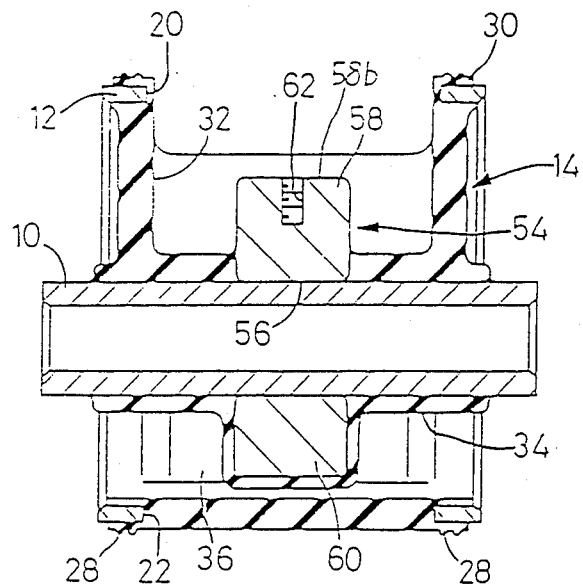
FIGS. 5, 6 and 7 are cross sectional views of the assembly of FIG. 4, taken along lines V—V, VI—VI and VII—VII of FIG. 4.

On the outer surface of an axially intermediate portion of the inner sleeve 10 secured to the inner surface of the rubber block 14, there is press-fitted a stopper block 54, such that a center bore 56 formed in the middle portion of the block 54 engages the outer surface of the inner sleeve 10, as indicated in FIGS. 4 through 6. The stopper block 54 has a generally elongate shape in transverse cross section as indicated in FIG. 4, and has a predetermined axial dimension as shown in FIG. 5. The stopper block 54 includes a base portion, and a pair of stopper portions 58, 60 which extend by a suitable dimension in the radial direction of the bushing, from the diametrically opposite ends of the base portion toward the pocket 34 and the void 34, respectively. The stopper portions 58, 60 are located opposite to each other in the vibration-input direction.

In the present embodiment, the stopper portions 58, 60 are adapted to prevent an excessive amount of relative displacement between the power unit and the body of the vehicle which are connected to the inner and third sleeve 10, 12. As seen in FIG. 2, the stopper portion 58 within the pressure-receiving chamber 44 has a pair of side surfaces 58a which face the axially opposed surfaces 15 of the rubber block 14 defining an axial dimension of the pressure-receiving chamber 44. The side surfaces 58a are spaced apart from the corresponding axially opposed surfaces 15 of the rubber block 14, by a predetermined axial distance. The stopper portion 58 has a radial end face 58b which is spaced apart from the outer sleeve 16 by a predetermined radial distance in the vibration-input direction. The periphery of the radial end face 58b is spaced apart from the periphery of the pressure-receiving chamber 44, more precisely, from the axially opposed surfaces 15, 15 of the rubber block 14, and the inner circumferential surface of the third sleeve 12, in the direction perpendicular to the vibration-input direction. Thus, the periphery of the radial end face 58b of the stopper portion 58 cooperates with the periphery of the pressure-receiving chamber 44, to define therebetween an annular spacing in a plane perpendicular to the vibration-input direction and parallel to the axis of the bushing.

The rubber block 14 is secured by vulcanization to the inner sleeve 10 on which the stopper block 54 is press-fitted. The stopper portion 60 of the stopper block 54 which is disposed in the void 34 is covered with a rubber layer having a suitable thickness. This rubber layer is an integral part of the rubber block 14.

In the present resilient bushing, a restrictor member 66 is fixedly disposed on the radial end face 58b of the stopper portion 58 within the pressure-receiving chamber 44. As shown in FIGS. 1 and 2, the restrictor member 66 is attached to the radial end face 58b by a screw 64 threaded in a tapped hole 62 formed in the stopper portion 58. The restrictor member 66 has a generally arcuate shape in transverse cross section of the bushing (FIG. 1), and a rectangular shape in axial cross section of the bushing (FIG. 2). The restrictor member 66 has a peripheral portion consisting of a pair of axial projections 66a and a pair of circumferential projections 66b. The axial projections 66a project a suitable distance in the axial direction of the bushing, from the side surfaces 58b of the stopper portion 58 of the stopper block 54, more precisely, from the axial ends of the radial end face 58b, so that the ends of the axial projections 66a are spaced apart from the corresponding axially opposed surfaces 15 of the rubber block 14 by a suitable axial distance. The circumferential projections 66b project from the periphery of the radial end face 58b in substantially the circumferential direction of the bushing, such that the ends of the projections 66b are spaced apart from the periphery of the pressure-receiving chamber 44, more precisely, from the inner circumferential surface of the outer sleeve 12, in the direction perpendicular to the vibration-input direction.

Thus, the axial and circumferential projections 66a, 66b of the restrictor member 66 cooperate with the axially opposed surfaces 15, 15 of the rubber block 14 and the inner surface of the third sleeve 12, to define therebetween a rectangularly annular gap 67 in the plane perpendicular to the vibration-input direction and parallel to the axial direction of the bushing. This annular gap 67 is obviously smaller than the aforementioned annular spacing formed around the periphery of the radial end face 58b of the stopper portion 58, since the projections 66a, 66b project from the periphery of the radial end face 58b. Thus, the axial and circumferential projections 66a, 66b substantially divide the pressure-receiving chamber 44 into a radially inner section and a radially outer section, which communicate with each other through the comparatively narrow annular gap 67. When a vibrational load is applied to the bushing in the direction (vibration-input direction) in which the pressure-chamber 44 and the void 34 are disposed, the incompressible fluid is forced to flow between the radially inner and outer sections of the pressure-receiving chamber 44, in the radial direction of the bushing, through the annular gap 67.

The stopper portion 58 of the stopper block 54 and the restrictor member 66 serve as damping means disposed within the pressure-receiving chamber 44, primarily for isolating high-frequency vibrations having a small amplitude. More specifically stated, a dimension of the axial and circumferential projections 66a, 66b as measured in the vibration-input direction, and an area of the annular gap 67 as measured in the plane perpendicular to the vibration-input direction and parallel to the axial direction of the bushing, are determined so that vibrations having a frequency range higher than that of the vibrations to be damped by the orifices 50, 52 may be effectively isolated, due to inertia of a mass of the incompressible fluid existing in the annular gap 67, and due to resonance of the fluid mass adjacent to the projections 66a, 66b, when the fluid is forced to flow through the annular gap 67 in the radial direction of the bushing upon application of such vibrations having comparatively high frequencies.

The restrictor member 66 consists of an inner metallic portion 68, and an outer rubber layer 70 secured to the outer surface of the inner metallic portion 68 by means of vulcanization. Reference number 72 in FIGS. 1 and 2, designates an access hole formed in the rubber layer 70, for driving the screw 64 into the tapped hole 62.

In the fluid-filled resilient bushing of the present invention constructed as described above, the incompressible fluid is forced to flow through the orifices 50, 52 between the pressure-receiving chamber 44 and the equilibrium chambers 46, 48, when the bushing receives low-frequency vibrations of a large amplitude in the direction of arrangement of the chamber 44 and the void 34, causing a relative displacement between the inner and third sleeves 10, 12. In this event, the input low-frequency vibrations can be effectively damped, due to inertia and resonance of the fluid mass in the orifices 50, 52. It is noted that elastic expansion of the elastically yieldable partition walls 36, 38 permits the fluid to flow from the pressure-receiving chamber 44 into the equilibrium chambers 46, 48. Further, the fluid in the expanded equilibrium chambers 46, 48 flows into the pressure-receiving chamber 44 due to elastic contraction of the partition walls 36, 38.

Where the vibrations applied to the bushing have a relatively high frequency and a relatively small amplitude, the fluid is less likely or difficult to flow through the orifices 50, 52, and the dynamic spring constant of the bushing cannot be reduced to an extent sufficient to isolate such high-frequency small-amplitude vibrations. In this case, however, the high-frequency vibrations applied to the bushing cause restricted flow of the fluid through the annular gap 67 formed within the pressure-receiving chamber 44, whereby the high-frequency vibrations can be effectively isolated due to inertia and resonance of the fluid mass present in the annular gap 67, while the fluid is forced to flow between the radially inner and outer sections of the pressure-receiving chamber 44. Therefore, the present fluid-filled resilient bushing is capable of exhibiting improved high-frequency vibration isolating characteristic, over the conventional counterpart without such an annular gap (67).

It will be understood from the above description that the present engine mount bushing is equivalent to the conventional bushing in terms of damping characteristic for low-frequency vibrations of a large amplitude, and is significantly improved over the conventional bushing, in terms of isolating characteristic for high-frequency vibrations of a small amplitude. This indicates totally improved vibration damping and isolating capability of the fluid-filled engine mount constructed according to the present invention.

The above-indicated arrangement is significantly simpler in construction and more economical to manufacture, than the conventional engine mount.

Furthermore, the stopper portions 58, 60 disposed within the pressure-receiving chamber 44 and the axial void 34 are adapted to be abuttable at their radial end faces upon the outer sleeve 16, in the event that the inner sleeve 10 and the third sleeve 12 are excessively displaced relative to each other in the vibration-input direction. Stated differently, the stopper block 54 prevents an excessive amount of relative displacement between the power unit and the body of the vehicle.

While the present invention has been described in its preferred embodiment with a certain degree of particularity, for illustrative purpose only, it is to be understood that the invention is by no means confined to the precise details of the illustrated embodiment, but may be otherwise embodied.

For instance, while the restrictor member 66 used in the illustrated embodiment are formed separately from the stopper block 54, the restrictor member 66 or its inner metallic portion 68 may be formed as integral part of the stopper block 54. It is also possible to provide only one stopper portion 58, and eliminate the other stopper portion 60 disposed within the void 34. Further, the dimension of the stopper block 54 as measured in the axial direction of the mount may be selected as needed.

In the present embodiment, the third sleeve 12 has the single common aperture 22 whose circumferential end portions are aligned with the respective recesses 40, 42 corresponding to the two equilibrium chambers 46, 48. However, it is possible that the third sleeve 12 has two separate apertures aligned with the respective recesses 40, 42. It is further possible to provide a single equilibrium chamber, or to adapt only one of the recesses 40, 42 to provide a single equilibrium chamber.

Although the inner and outer sleeves 10, 16 of the illustrated engine mount are disposed such that these two sleeves are eccentric with each other by a suitable radial distance in the vibration-input direction, the inner and outer sleeves 10, 16 may be disposed in concentric relation with each other.

While the illustrated embodiment of the fluid-filled bushing has been described as an engine mount for the F—F (front-engine front-drive) vehicle, the present bushing may also be used for the other purposes, for example, as a bushing for the suspension system of an automotive vehicle. Where the present bushing is used as a vehicle suspension bushing, it is common that the inner and outer sleeves (10, 16) are disposed concentrically with each other.

While in the illustrated embodiment the stopper portion 58 is provided as an integral part of the stopper block 54, it is possible to employ a separate stopper portion (58) and fix it to a portion of the rubber block 14 located at the bottom of the pocket 32.

Furthermore, although the partition wall 36, 38 is formed as an integral part of the rubber block 14 in the illustrated embodiment, the partition wall or walls may be formed separately from the rubber block 14.

It is further to be understood that the invention may be embodied with various other alterations, modifications and improvements which may occur to those skilled in the art, without departing from the spirit and scope of the invention defined in the following claims.

What is claimed is:

1. A fluid-filled resilient bushing, comprising:
   an inner sleeve;
   an outer sleeve disposed in radially outwardly spaced-apart relation with said inner sleeve;
   a generally annular resilient member interposed between said inner and outer sleeves so as to connect the inner and outer sleeves, and having a pocket and an axial void which are located opposite to each other in a diametric direction of said inner sleeve parallel to a first direction in which the bushing receives a vibrational load, said void being formed over an entire axial length of said resilient member,
   said outer sleeve and said resilient member cooperating to define a fluid-tight pressure-receiving chamber such that said pocket is fluid-tightly closed by the outer sleeve, said pressure-receiving chamber being filled with an incompressible fluid;
   an elastically yieldable thin-walled partition member disposed in said axial void, so as to form at least one recess, said outer sleeve and said partition member cooperating to define at least one equilibrium chamber such that said at least one recess is fluid-tightly closed by the outer sleeve, said at least one equilibrium chamber being filled with said incompressible fluid;
   means for defining at least one orifice which communicates with said pressure-receiving chamber and said at least one equilibrium chamber, and which permits flows of said incompressible fluid between the pressure-receiving chamber and the at least one equilibrium chamber; and
   damping means disposed within said pressure-receiving chamber, and extending from a bottom of said pocket substantially in said first direction, said damping means including a first portion extending from said bottom of the pocket and a second portion provided on said first portion,
   said first portion of the damping means having a radial end face spaced apart from said outer sleeve by a predetermined radial distance in said first direction, said radial end face having a peripheral edge which is spaced apart from a periphery of said pressure-receiving chamber in a second direction perpendicular to said first direction, said peripheral edge of the radial end face and said periphery of the pressure-receiving chamber cooperating to define therebetween an annular spacing in a plane which is parallel to said second direction and an axial direction of said resilient member,
   said second portion of the damping means projecting from said first portion substantially in said second direction, such that said second portion cooperates with said periphery of the pressure-receiving chamber, to define in said plane an annular gap which is smaller than said annular spacing.

2. A fluid-filled resilient bushing according to claim 1, wherein said resilient member includes a support portion which is situated at said bottom of said pocket and fixed to said inner sleeve, said first portion of said damping means being supported by said support portion.

3. A fluid-filled resilient bushing according to claim 1, further comprising a support member which is supported by said inner sleeve, said first portion of said damping means being supported by said support member at said bottom of said pocket of said resilient member.

4. A fluid-filled resilient bushing according to claim 1, wherein said second portion of said damping means comprises a restrictor secured to said radial end face of said first portion, said restrictor including a peripheral portion projecting from said peripheral edge of the radial end face in said second direction.

5. A fluid-filled resilient bushing according to claim 4, wherein said restrictor member has a pair of axial projections which project from said peripheral edge of said radial end face of said first portion of said damping means, and a pair of circumferential projections which project from said peripheral edge of said radial end face of said first portion in a substantially circumferential direction of said generally annular resilient member, said pair of circumferential projections being spaced from an inner circumferential surface of said outer sleeve by a predetermined distance in said second direction.

6. A fluid-filled resilient bushing according to claim 4, wherein said restrictor member includes a radial inner metallic portion secured to said radial end face of said first portion, and a radially outer elastic portion secured to said radially inner metallic portion.

7. A fluid-filled resilient bushing according to claim 4, wherein said restrictor member has a generally arcuate cross sectional shape in a plane perpendicular to an axis of the bushing.

8. A fluid-filled resilient bushing according to claim 4, wherein said restrictor member is secured to said radial end face of said first portion by threaded fastening means.

9. A fluid-filled resilient bushing according to claim 4, wherein a dimension of said peripheral portion of said restrictor member as measured in said first direction, and an area of said annular gap as measured in said plane, are determined so that high-frequency vibrations are isolated in said pressure-receiving chamber.

10. A fluid-filled resilient bushing according to claim 1, wherein said elastically yieldable partition member includes a pair of partition walls defining a pair of recesses which cooperate with said outer sleeve to define a pair of equilibrium chambers.

11. A fluid-filled resilient bushing according to claim 1, wherein said means for defining an orifice comprises an intermediate sleeve disposed between said outer sleeve and said resilient member and having a plurality of apertures each of which is aligned with a corresponding one of openings of said pocket and said at least one recess of said resilient member, said intermediate sleeve having at least one circumferential groove formed in an outer circumferential surface thereof, said orifice being formed such that said at least one circumferential groove is closed by said outer sleeve and is open at opposite ends thereof in both said pressure-receiving chamber and a corresponding one of said at least one equilibrium chamber.

12. A fluid-filled resilient bushing according to claim 1, wherein said pocket is formed in an axially middle portion of said generally annular resilient member.

13. A fluid-filled resilient bushing according to claim 1, wherein said inner and outer sleeves are disposed eccentrically with each other in said first direction, so that the inner and outer sleeves are brought into concentric relation with each other when the bushing is mounted in place.

14. A fluid-filled resilient bushing according to claim 1, wherein said second portion of said damping means is formed integral with said first portion.

15. A fluid-filled resilient bushing according to claim 1, wherein said first portion of said damping means is abuttable at said radial end face thereof upon said outer sleeve, in the event that said inner sleeve and the outer sleeve are excessively displaced relative to each other in said diametric direction in which said pressure-receiving chamber and said axial void are located.

16. A fluid-filled resilient bushing according to claim 3, wherein said support member has a stopper portion disposed within said axial void.

17. A fluid-filled resilient bushing according to claim 1, wherein said partition member is formed integral with said resilient member.

* * * * *